(12) United States Patent
Vigild et al.

(10) Patent No.: US 9,181,828 B2
(45) Date of Patent: Nov. 10, 2015

(54) INTERNAL COMBUSTION ENGINE HAVING TURBOCHARGING AND LOW-PRESSURE EXHAUST-GAS RECIRCULATION

(75) Inventors: Christian Winge Vigild, Aldenhoven (DE); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 943 days.

(21) Appl. No.: 12/569,763

(22) Filed: Sep. 29, 2009

(65) Prior Publication Data

US 2010/0095673 A1  Apr. 22, 2010

(30) Foreign Application Priority Data

Oct. 22, 2008  (DE) .......................... 10 2008 043 036

(51) Int. Cl.
| | |
|---|---|
| *F02B 33/44* | (2006.01) |
| *F01N 3/00* | (2006.01) |
| *F01N 5/02* | (2006.01) |
| *F01N 3/021* | (2006.01) |
| *F01N 9/00* | (2006.01) |
| *F02M 25/07* | (2006.01) |

(Continued)

(52) U.S. Cl.
CPC ......... *F01N 3/021* (2013.01); *F01N 5/02* (2013.01); *F01N 9/00* (2013.01); *F02D 41/0065* (2013.01); *F02M 25/074* (2013.01); *F02M 25/0709* (2013.01); *F02B 29/0418* (2013.01); *F02D 41/005* (2013.01); *F02M 25/0728* (2013.01); *Y02T 10/16* (2013.01); *Y02T 10/20* (2013.01); *Y02T 10/47* (2013.01)

(58) Field of Classification Search
CPC ............... F01N 3/02; F01N 5/02; F01N 9/00; F02M 25/074; F02M 25/0709; F02D 41/0065
USPC ................... 60/297, 311, 312, 605.2
See application file for complete search history.

(56) References Cited

U.S. PATENT DOCUMENTS 5,655,366 A    8/1997  Kawamura
5,853,459 A *  12/1998 Kuwamoto et al. ............. 95/273

(Continued)

FOREIGN PATENT DOCUMENTS

CN         1727652 A      2/2006
DE   10 2005 025 924     3/2006

OTHER PUBLICATIONS

Partial Translation of Office Action of Chinese Application No. 200910168405.5, Issued Nov. 5, 2012, State Intellectual Property Office of PRC, 8 Pages.

(Continued)

*Primary Examiner* — Kenneth Bomberg
*Assistant Examiner* — Jason Sheppard
(74) *Attorney, Agent, or Firm* — Julia Voutyras; Alleman Hall McCoy Russell & Tuttle LLP

(57) ABSTRACT

The description relates to an internal combustion engine having a turbocharger, having a first particle filter in the intake section of the internal combustion engine and having a low-pressure EGR line that comprises a second particle filter. A fast-reacting low-pressure exhaust gas recirculation system with small dimensions can be realized by virtue of the EGR line branching off from the exhaust section upstream of the first particle filter, and the second particle filter being provided with a heater. The description also relates to a corresponding EGR method.

11 Claims, 2 Drawing Sheets

(51) Int. Cl.
*F02B 29/04* (2006.01)
*F02D 41/00* (2006.01)

(56) References Cited

U.S. PATENT DOCUMENTS

| | | | |
|---|---|---|---|
| 7,866,146 B2* | 1/2011 | Konstandopoulos | 60/311 |
| 2004/0006978 A1* | 1/2004 | Beck et al. | 60/289 |
| 2006/0266018 A1* | 11/2006 | Durand | 60/276 |
| 2007/0068149 A1* | 3/2007 | Weber et al. | 60/312 |
| 2007/0130921 A1* | 6/2007 | Yezerets et al. | 60/295 |
| 2007/0137627 A1* | 6/2007 | Durand et al. | 123/568.12 |
| 2007/0143007 A1* | 6/2007 | Durand | 701/207 |
| 2008/0034737 A1* | 2/2008 | Otsubo et al. | 60/292 |
| 2008/0041051 A1 | 2/2008 | Silbermann et al. | |
| 2008/0092861 A1* | 4/2008 | Duffy et al. | 123/568.12 |
| 2009/0113883 A1* | 5/2009 | Bhatia et al. | 60/320 |
| 2009/0241513 A1* | 10/2009 | Collins et al. | 60/274 |

OTHER PUBLICATIONS

Translation of ISA German Patent and Trademark Office, German Examination Report 10 2008 043 036.6-13, Aug. 7, 2009, 8 pages.

* cited by examiner

INTERNAL COMBUSTION ENGINE HAVING TURBOCHARGING AND LOW-PRESSURE EXHAUST-GAS RECIRCULATION

CROSS REFERENCE TO PRIORITY APPLICATION

The present application claims priority to German Patent Application No. 102008043036.0, filed Oct. 22, 2008, titled "Internal Combustion Engine Having Turbocharging and Low-Pressure Exhaust-Gas Recirculation," the entire contents of each of which are incorporated herein by reference.

TECHNICAL FIELD

The description relates to an internal combustion engine having a turbocharger, having a first particle filter in the exhaust section of the internal combustion engine and having a low-pressure exhaust-gas recirculation (EGR) line that comprises a second particle filter, and to a method for exhaust-gas recirculation in an internal combustion engine having turbocharging and having low-pressure exhaust-gas recirculation.

BACKGROUND AND SUMMARY

A device of said type and a method of said type are known from DE 10 2006 038 706 A1. Here, for the purpose of nitrogen oxide reduction, recirculated exhaust gas is branched off from the exhaust section downstream of a first particle filter and upstream of a catalytic converter and a silencer. The second particle filter in the low-pressure EGR line may passively assume a temperature of up to 800° C. as a result of the hot exhaust gases.

In contrast to a high-pressure EGR system, in which the recirculated exhaust gas is branched off upstream of the turbine of the turbocharger, in a low-pressure EGR system, the recirculated exhaust gas is branched off downstream of the turbine of the turbocharger after having passed through a particle filter. As a result, a low-pressure EGR system has the disadvantages, in low-load operation, of a higher back pressure, and a longer build-up phase of the proportion of unburned mass in the inlet, than a high-pressure EGR system.

The description is based on the object of providing an improved low-pressure EGR system.

Said object is achieved with a generic device and a generic method by means of the characterizing features of the claims that follow.

In one embodiment the present description provides for an EGR system for an internal combustion engine, comprising: internal combustion engine having a turbocharger, an intake system, and an exhaust system; a first particle filter located in said exhaust system at a location downstream of a turbine of said turbocharger; a second particulate filter located in a EGR line having inlet located in said exhaust system at a location upstream of said first particle filter, said second particulate filter having a heater.

By having the EGR line branch off from the exhaust section upstream of the first particle filter, less mass flow need pass through the first particle filter and/or an oxidation catalytic converter, such that the exhaust-gas back pressure is reduced. Furthermore, the volume of the EGR section can be significantly reduced. This significantly improves the response speed of the EGR system. Soot and oil particles which are contained in the recirculated exhaust gas, and which may not pass into the compressor of the turbocharger, can be combusted by means of the heatable particle filter, such that said particle filter does not become easily blocked. Furthermore, a heatable particle filter of said type may be significantly smaller than a conventional particle filter, for example less than half the volume.

It is expedient for the heatable particle filter not to be held constantly at a temperature at which soot and oil particles combust, but rather to be heated only in phases for the purpose of regeneration. Suitable times for this are for example operating states in which the turbocharger is running at only a low rotational speed, in order that soot and oil particles that may be released, un-combusted or only partially combusted, from the filter structure do not degrade the compressor of the turbocharger. Furthermore, at a low rotational speed of the turbocharger, the gas throughput through the filter is low, such that the heating power to be imparted is low.

Advantageous refinements of the description can be gathered from the subclaims and the description.

The description is explained in more detail below on the basis of the drawing.

BRIEF DESCRIPTION OF THE DRAWINGS

Further advantageous refinements of the description are disclosed in the dependent claims and in the following description of the figures:

DETAILED DESCRIPTION

Figure 1:
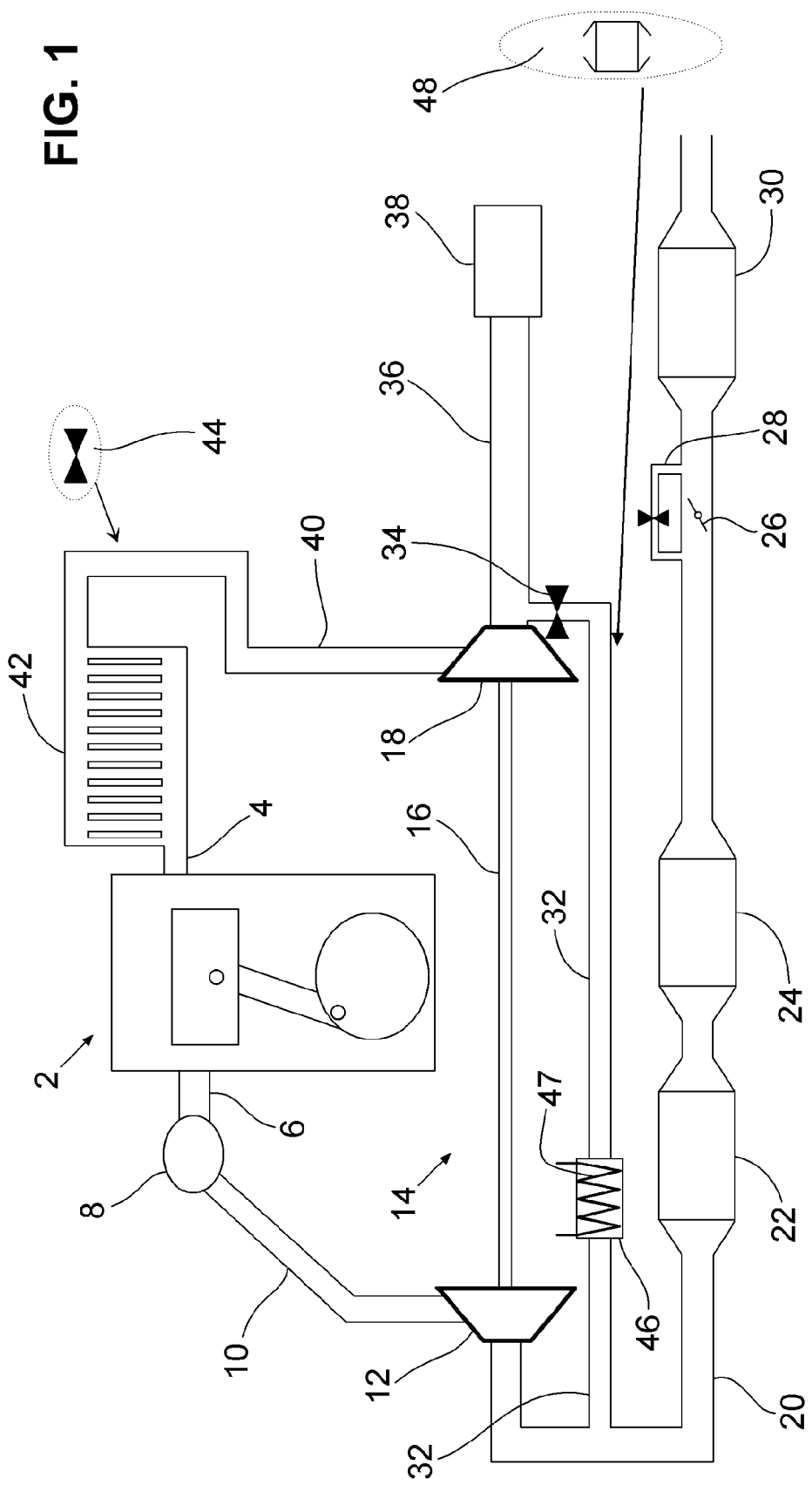
FIG. 1 shows a schematic illustration of an engine EGR system.

The FIG. 1 shows a diagrammatic sketch of an internal combustion engine having turbocharging and having low-pressure exhaust-gas recirculation. Although the exemplary embodiment relates to a diesel engine, the description may however also be applied to other types of internal combustion engine.

A schematically illustrated multi-cylinder diesel engine 2 has inlet ducts 4 and outlet ducts 6. The outlet ducts 6 open out via a collector 8 into an exhaust line 10, which opens out into a turbine 12 of a turbocharger 14. The turbine 12 is coupled by means of a shaft 16 to a compressor 18 of the turbocharger 14. The turbocharger 14 may be a turbocharger with fixed geometry (FGT) or a turbocharger with variable geometry (VGT).

The outlet of the turbine 12 is adjoined by an exhaust section 20 in which are arranged, in this sequence, a diesel oxidation catalytic converter 22, a diesel particle filter 24, a control system for controlling the exhaust-gas back pressure, which control system comprises a throttle flap 26 and a bypass 28, which leads past the throttle flap 26, with an integrated valve, and a silencer 30.

A low-pressure EGR line 32 is connected to the exhaust section 20 downstream of the turbine 12 and upstream of the diesel oxidation catalytic converter 22, which low-pressure EGR line 32 opens out via an EGR valve 34 into a fresh-air line 36 that conducts fresh air from an air filter 38 into the compressor 18 of the turbocharger 14.

The mixture of fresh air and recirculated exhaust gas that is compressed by the compressor 18 passes via an air inlet line 40 into a combined inlet air cooler and distributor 42, where said mixture is cooled and distributed between the inlet ducts 4. The inlet air cooler and distributor 42 comprises a bypass (not shown), with the inlet air mixture being conducted, as required, either through the inlet air cooler and distributor 42 or through the bypass and past the inlet air cooler and distributor 42.

A throttle flap 44 may also be provided in the inlet line 40 in order to close the inlet line 40 when the diesel engine 2 is shut down.

The low-pressure EGR line 32 comprises a heatable particle filter 46 that is traversed by the recirculated exhaust gas. The particle filter 46 comprises an electric heater, for example in the form of grids, which are integrated into the filter matrix, composed of heating or glow wires 47, by means of which any soot and oil particles in the recirculated exhaust gas are burned.

The low-pressure EGR line 32 may also comprise, downstream of the particle filter 46 and upstream of the EGR valve 34, a heat exchanger 48 that dissipates the heat contained in the exhaust gas to an arbitrary heat sink—such as for example the inlet air collector and cooler 40. The heat exchanger 48 comprises a bypass (not shown), with the inlet air mixture being conducted selectively either through the heat exchanger 48 or through the bypass and past the heat exchanger 48.

Figure 2:
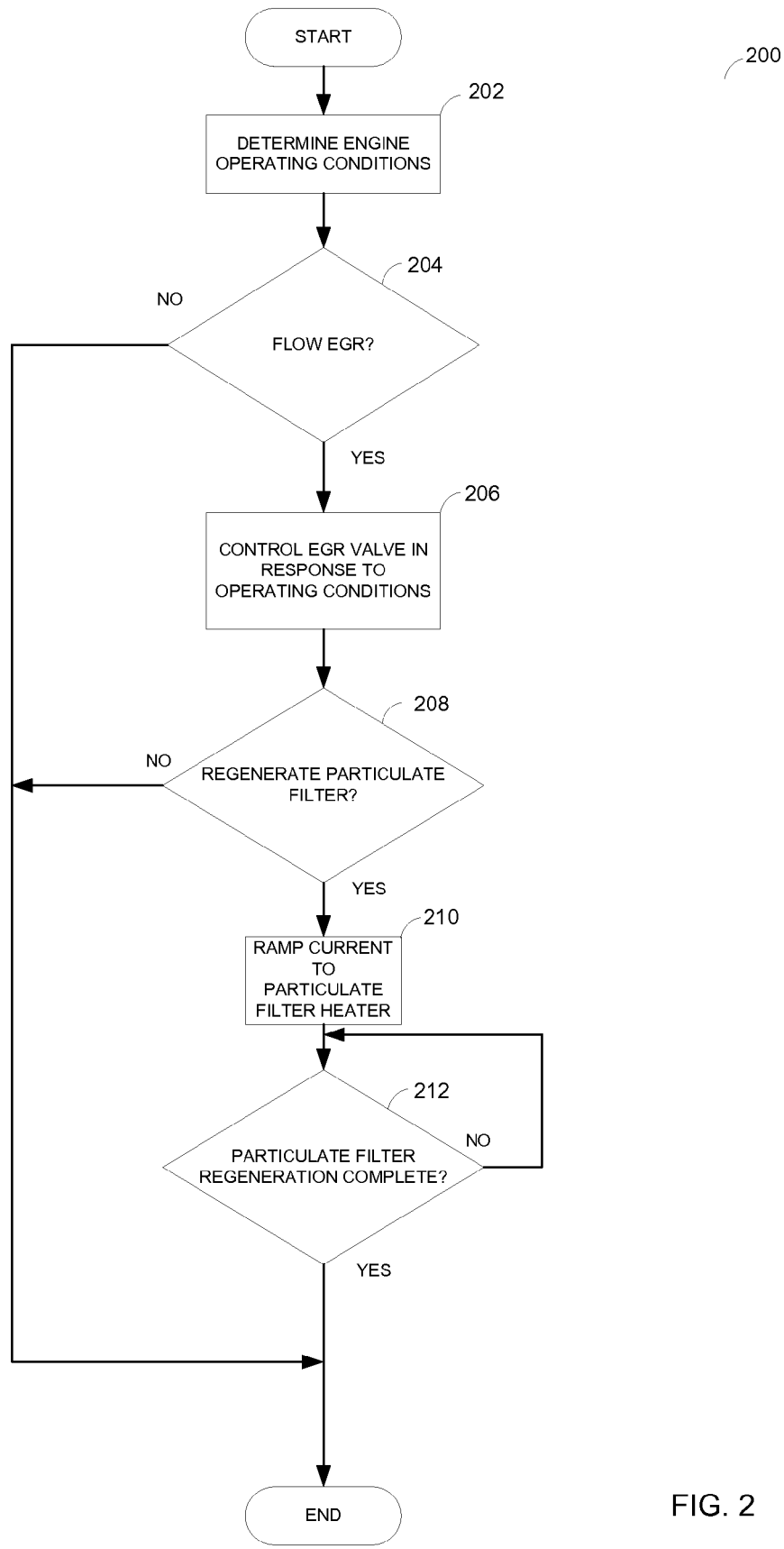
FIG. 2 shows a schematic illustration of a flow chart of a method to control exhaust-gas recirculation.

Referring now to FIG. 2, a method to control EGR for an internal combustion engine is shown. Routine 200 begins at 202 where engine operating conditions are determined. Engine operating conditions are determined from sensors and actuators. In one example, routine 200 determines engine temperature, ambient temperature, the pressure drop across a particulate filter in the high pressure EGR loop, the pressure drop across a particulate filter in the exhaust system, time since engine start, engine load, engine torque demand, engine speed, and amount of air inducted to the engine. In other example embodiments, additional or fewer operating conditions may be determined based on specific objectives.

At 204, the routine judges whether or not to flow EGR. The decision to flow EGR may be based on the operating conditions determined at 202. In one example, EGR is activated after the engine has been operating for a threshold amount of time and after engine coolant temperature reaches a threshold level. In addition, other conditions may be used to activate or enable the EGR system. For example, EGR may be enabled after engine load is greater than a threshold or after engine speed exceeds a threshold. Routine 200 then proceeds to 206 if EGR is activated. Otherwise, routine 200 proceeds to exit.

At 206, the EGR valve is controlled in response to engine operating conditions. In one example, the EGR valve position is related to engine speed and driver demand torque. The EGR valve positions may be stored in a table or function indexed by engine speed and driver demand torque. The EGR valve positions correspond to an empirically determined EGR flow rate. The EGR valve position may be controlled by a vacuum actuator or by a stepper motor, for example.

At 208, routine 200 judges whether or not to regenerate a particulate filter in the EGR loop. In one embodiment, routine 200 makes a decision based on the pressure drop across a particulate filter. In another embodiment, routine 200 may decide to regenerate the particulate filter in response to a model. For example, a soot accumulation model that estimates the amount of soot produced by an engine may be the basis for regenerating a particulate filter. If the estimated amount of soot exceeds a threshold, particulate filter regeneration is initiated. On the other hand, if a pressure across the particulate filter is determined from a sensor or an estimating model, particulate filter regeneration may be initiated after the observed or estimated pressure exceeds a threshold.

In addition, other conditions may be included that determine when to regenerate the particulate filter. For example, filter regeneration may not proceed if engine temperature is above a threshold temperature or if engine temperature is below a threshold temperature.

In one embodiment an electrically heated particulate filter is activated after EGR begins flowing in the EGR tube so that oxidized particulate matter may be oxidized and released from the filter and then flow back into the engine before being exhausted. Further, in one embodiment, the temperature of the particulate filter may be elevated by flowing EGR into the engine for a predetermined amount of time before the electrical heater is activated to heat the particulate filter. In other words, current is not supplied to the particulate filter heater until exhaust gases have flowed from the exhaust system to the intake system for a threshold amount of time or until the particulate filter reaches a threshold temperature. By elevating the particulate filter temperature with exhaust gases, it is possible to lower the thermal gradient that the filter is exposed to and therefore degradation of the particulate filter and particulate filter heater may be reduced. In one example, the rate that current is applied to the particulate filter heater may be related to the temperature of the particulate filter at a time when regeneration is requested. For example, as the temperature of the particulate filter increases, the amount of current supplied to the particulate filter over a period of time can be increased. If particulate filter regeneration is desired and conditions are met, routine 200 proceeds to 210. Otherwise, routine 200 proceeds to exit.

At 210, current is ramped to the electrical particulate filter heater that is in the EGR loop. For example, current may be applied at a low level and increased over a period of time. In one example, the heater current is ramped when the engine is relatively cold. For example, if the engine is started at 20° C. the particulate filter heater current may be slowly ramped so that heater or particulate filter performance does not degrade. At higher temperatures, the particulate filter heater current may be ramped at a higher rate of current per second. Thus, under a first condition of a particulate filter heater current is ramped at a first rate of current, and under a second condition of a particulate filter heater current is ramped at a second rate.

At 212, routine 200 judges whether or not particulate filter regeneration is complete or if conditions for regeneration are no longer present. In one embodiment, regeneration is determined complete when the pressure difference across the particulate filter is less than a predetermined amount. If routine 200 judges that regeneration is complete, routine 200 proceeds to exit. Otherwise, routine continues to loop back.

It will be appreciated that the configurations disclosed herein are exemplary in nature, and that these specific embodiments are not to be considered in a limiting sense, because numerous variations are possible. For example, the above systems can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for providing EGR in an internal combustion engine having an exhaust system and an intake system, comprising:

flowing exhaust gases in an EGR line, said EGR line connecting to said exhaust system at a location in said exhaust system that is downstream of a turbine and upstream of a first particulate filter and an oxidation catalyst, said oxidation catalyst upstream of the first particulate filter, said exhaust gases flowing through a second particulate filter that is heated by an electrical heater, said second particulate filter disposed in said EGR line that enters said intake system; and activating the electrical heater in response to turbocharger rotational speed and applying a level of current to the electrical heater and increasing the level of current at a ramp rate responsive to an increasing temperature of said second particulate filter.

2. The method of claim 1, wherein exhaust constituents held by said second particulate filter are combusted by said electrical heater, where the ramp rate is a first rate when a temperature of the second particulate filter is a first temperature, and where the ramp rate is a second rate when the temperature of the second particulate filter is a second temperature.

3. The method of claim 1, wherein said exhaust gases flow to said intake system at a location upstream of a compressor.

4. The method of claim 1, wherein said exhaust system comprises an oxidation catalyst located in said exhaust system at a location downstream of the location at which said EGR line connects to said exhaust system, said oxidation catalyst located upstream or downstream of said first particulate filter.

5. The method of claim 1, wherein said engine is a diesel engine, and where the ramp rate increases with the increasing temperature of the second particulate filter.

6. A method for controlling EGR of an engine having exhaust and intake systems, comprising:

flowing exhaust gases in an EGR line, said EGR line having an inlet located downstream of a turbine of a turbocharger and upstream of a first particulate filter (PF) and an oxidation catalyst, the oxidation catalyst located upstream of the first PF, from said inlet to the intake system, the EGR line including a second PF and an associated electric heater;

activating the electric heater in response to rotational speed of the turbocharger; and applying a first PF heater current and increasing the first PF heater current at a ramp rate responsive to a temperature of the second PF.

7. The method of claim 6, wherein said exhaust gases flow to said intake system at a location upstream of a compressor, and where the ramp rate increases as the temperature of the second PF increases.

8. The method of claim 6, wherein said exhaust system comprises an oxidation catalyst located in said exhaust system at a location downstream of where the inlet of said EGR line connects to said exhaust system, said oxidation catalyst located upstream or downstream of said first PF.

9. The method of claim 6, further comprising activating said electric heater only after said engine has operated for a threshold amount of time.

10. The method of claim 6, further comprising activating said electric heater only after a temperature of said exhaust gases exceeds a threshold.

11. The method of claim 6, wherein electrical current supplied to said electric heater is gradually increased after activating said electric heater.

* * * * *